(12) United States Patent
Ishizu et al.

(10) Patent No.: US 10,197,374 B2
(45) Date of Patent: Feb. 5, 2019

(54) MEASURING APPARATUS

(71) Applicant: MITUTOYO CORPORATION, Kanagawa (JP)

(72) Inventors: Kazuhiro Ishizu, Kawasaki (JP); Ryohei Kanno, Kawasaki (JP); Takahiro Ito, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 15/248,507

(22) Filed: Aug. 26, 2016

(65) Prior Publication Data

US 2017/0059295 A1    Mar. 2, 2017

(30) Foreign Application Priority Data

Aug. 31, 2015 (JP) ................. 2015-170256

(51) Int. Cl.
*G01B 3/00* (2006.01)
*G01B 5/00* (2006.01)

(52) U.S. Cl.
CPC ........... *G01B 5/0004* (2013.01); *G01B 3/008* (2013.01); *G01B 5/0002* (2013.01)

(58) Field of Classification Search
CPC ..... G01B 3/008; G01B 5/0002; G01B 5/0004
USPC .................. 33/503, 555, 559, 561
See application file for complete search history.

(56) References Cited

U.S. PATENT DOCUMENTS

| | | | | |
|---|---|---|---|---|
| 6,128,968 A | * | 10/2000 | Nishina ................. | G01B 5/012 74/99 A |
| 6,434,851 B1 | * | 8/2002 | Nishina ................. | F02K 1/763 33/559 |
| 6,829,838 B1 | * | 12/2004 | Weekers et al. ..... | G01B 5/0014 33/503 |

FOREIGN PATENT DOCUMENTS

| | | | | |
|---|---|---|---|---|
| DE | 3444956 A1 | * | 6/1985 | ............. G01B 3/008 |
| JP | 2001-356012 A | | 12/2001 | |
| JP | 3276331 B2 | * | 4/2002 | ............. G01B 5/012 |

* cited by examiner

*Primary Examiner* — R. A. Smith
(74) *Attorney, Agent, or Firm* — Greenblum & Bernstein, P.L.C.

(57) ABSTRACT

A measuring apparatus of the present invention includes a stage on which a measured object is placed, a measurement head having an information obtainer obtaining an image of the object, and a vertical driver supporting the measurement head so as to allow movement in a vertical direction. The vertical driver includes a counterbalance mechanism having a hanger of the measurement head, a pulley winding up and withdrawing the hanger by rotation, a spring increasing elastic force by stretching the spring when the measurement head displaces downward, and a cam rotating in conjunction with the pulley and having a cam shape decreasing rotational torque provided to the pulley by the elastic force as a stretching amount of the spring increases.

6 Claims, 5 Drawing Sheets

MEASURING APPARATUS

CROSS-REFERENCE TO RELATED APPLICATIONS

The present application claims priority under 35 U.S.C. § 119 of Japanese Application No. 2015-170256, filed on Aug. 31, 2015, the disclosure of which is expressly incorporated by reference herein in its entirety.

BACKGROUND OF THE INVENTION

1. Field of the Invention

The present invention relates to a measuring apparatus, and in particular, relates to a measuring apparatus having a measurement head measuring an object, the measurement head being configured to be displaceable at least in a vertical direction.

2. Description of Related Art

Measuring apparatuses exist which perform various measurements related to a measured object by displacing a measurement head in a vertical direction (gravity direction, for example). One example of these is an image measuring apparatus capturing an image of the object placed on a stage and measures a size (such as an external dimension or a hole diameter) of the object by processing the image. The measurement head capturing the image of the object is provided with a camera (image acquirer). A position relationship between the measurement head and the object can be defined along at least three axes in X, Y, and Z directions.

In a measuring apparatus of this kind, the measurement head is a heavy object having the camera and an optical system. Therefore, a heavy load is imposed on a driver when displacing the measurement head. Particularly, in a case where the measurement head is displaced in the vertical direction (Z axis direction), in order to displace the measurement head to a desired height and to maintain the measurement head at that height, a drive mechanism such as a motor is desired with high durability and reliability. In addition, maintaining the measurement head at an arbitrary height position becomes difficult when power is off.

Japanese Patent Laid-open Publication No. 2001-356012 discloses a configuration in which a balance weight is provided to a mechanism displacing a detecting element such as a touch probe of a coordinate measuring apparatus in the Z axis direction. However, in a case where the balance weight is provided to counterbalance the measurement head (a heavy object like the image measuring apparatus), a balance weight having an equal weight to the measurement head is required. Accordingly, weight reduction of an overall apparatus becomes difficult and a space to arrange a large balance weight becomes necessary, and therefore size reduction of the apparatus becomes difficult.

Therefore, a configuration may be considered where a spring is used instead of the balance weight. In other words, a force of the measurement head attempting to descend is counteracted by an elastic force from the spring. By using the spring, the weight and size reduction of the apparatus can be achieved.

However, when using the spring, stretching of the spring (elastic force) changes based on a position of the measurement head and constant resistance force can not be obtained. Therefore, control to maintain position based on where the measurement head is positioned becomes difficult.

SUMMARY OF THE INVENTION

The present invention provides a measuring apparatus which is capable of reducing an overall weight and size of the apparatus and controlling a position of a measurement head stably and highly accurately.

In order to resolve the above-noted concern, the measuring apparatus according to the present invention provides a stage on which a measured object is placed, a measurement head having an information obtainer obtaining information about the object, and a vertical movement mechanism supporting the measurement head so as to allow movement in a vertical direction. The vertical movement mechanism includes a counterbalance mechanism having a hanging member of the measurement head, a pulley winding up and withdrawing the hanging member by rotation, a spring increasing elastic force by stretching the spring when the measurement head displaces downward, and a cam rotating in conjunction with the pulley and inhibiting an increase of rotational torque of the pulley due to the increase of the elastic force by stretching the spring.

With such a configuration, even when the spring is stretched by the measurement head displacing downward and the elastic force increases, an increase of the force lifting the measurement head is inhibited. Therefore, regardless of the stretching amount of the spring, the position of the measurement head in the vertical direction can be maintained stably.

In the measuring apparatus of the present invention, the cam of the counterbalance mechanism may have a shape that keeps a balance between the force of the measurement head attempting to descend and the force lifting the measurement head and obtained by the rotational torque. With such a configuration, even when the elastic force of the spring changes based on the position of the measurement head in the vertical direction, resistance force against the measurement head descending can be kept constant.

In the measuring apparatus of the present invention, a distance between a center of rotation of the cam of the counterbalance mechanism and a position (force point) where the elastic force of the spring is provided to the cam may grow shorter as the elastic force of the spring increases. With such a configuration, the more the stretching amount of the spring increases, the shorter the distance between the force point and a fulcrum of the force provided to the cam becomes, and therefore changes in the rotational torque of the cam and the pulley can be inhibited.

The measuring apparatus of the present invention may further include an adjuster adjusting an attachment position of a fixed end of the spring of the counterbalance mechanism. With such a configuration, adjustments of the elastic force of the spring due to individual differences can be performed.

The measuring apparatus of the present invention may further include a horizontal displacement mechanism displacing the measurement head horizontally together with the vertical movement mechanism. With such a configuration, displacement of the measurement head, including the vertical movement mechanism, in a horizontal direction can be facilitated.

The measuring apparatus of the present invention may further include a guide guiding, in the vertical direction, a base member to which an information obtainer is fixated, and a driver driving the base member along the guide in the vertical direction. With such a configuration, a load to the driver is reduced and the displacement control of the measurement head can be performed with ease and a high degree of accuracy.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
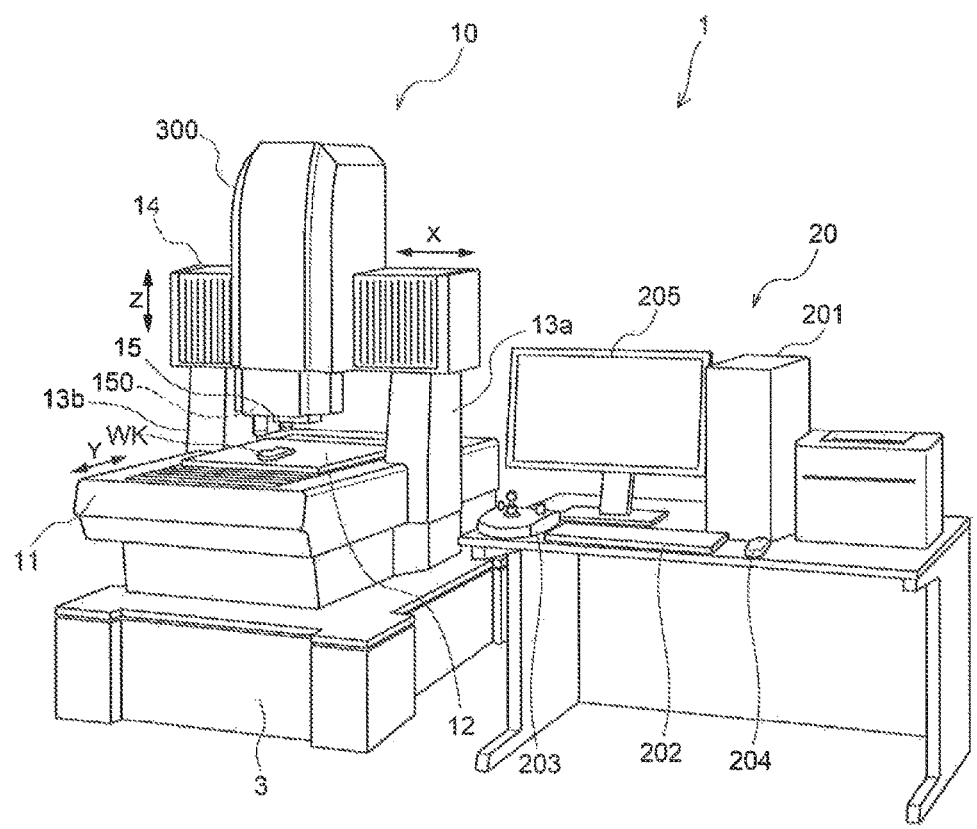
FIG. 1 illustrates an overall configuration of an image measuring apparatus according to the present embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings. In the following description, portions identical to those which have been previously described are assigned identical reference numerals and a description thereof is omitted where appropriate.

Overall Configuration of Measuring Apparatus

FIG. 1 illustrates a measuring apparatus according to the embodiment, and more specifically, an overall configuration of an image measuring apparatus 1. As shown in FIG. 1, the image measuring apparatus 1 according to the embodiment includes an apparatus main body 10 and a computer system 20. The apparatus main body 10 includes a table 11, a stage 12, an X-axis guide 14, and an image capture apparatus 15. In the present embodiment, an X axis direction (direction following the X axis) is in one direction along a surface of the stage 12. A Y axis direction (direction following the Y axis) is in a direction orthogonal to the X axis direction along the surface of the stage 12. A Z axis direction (direction following the Z axis) is a direction orthogonal to the X and Y axis directions. The Z axis direction may also be referred to as a vertical direction. The X and Y axis directions may also be referred to as a horizontal direction.

The table 11 is positioned on an anti-vibration table 3, for example, and inhibits external vibrations from being transmitted to the stage 12 on the table 11 and to the image capture apparatus 15. The stage 12 is positioned above the table 11. The stage 12 is a table where a work piece WK, which is a measured object, is mounted. The stage 12 is provided so as to be capable of being displaced by a Y-axis drive mechanism (not shown in the drawings) in the Y axis direction with respect to the table 11.

Support portions 13a and 13b are provided on two side portions of the table 11. The support portions 13a and 13b are each provided extending upward from the side portions of the table 11. The X-axis guide 14 is provided bridging the tops of the support portions 13a and 13b. The image capture apparatus 15 is attached to the X-axis guide 14. The image capture apparatus 15 of the image measuring apparatus 1 is an example of a measurement head. The image capture apparatus 15 is provided so as to be capable of being displaced by an X-axis drive mechanism (not shown in the drawings) in the X axis direction along the X-axis guide 14.

The image capture apparatus 15 is provided so as to be capable of being displaced by a Z-axis drive mechanism 300 in the Z axis direction and includes an information obtainer 150 obtaining information about the work piece WK, and more specifically image information. The Z-axis drive mechanism 300 is an example of a vertical movement mechanism (also referred to as a vertical driver). With this configuration, a relative positional relationship between the work piece WK on the stage 12 and the image capture apparatus 15 can be defined along each of the X, Y, and Z axes. In other words, by adjusting this positional relationship, an image capture region of the image capture apparatus 15 can be matched to a measurement region of the work piece WK.

The computer system 20 includes a computer main body 201, a keyboard 202, a mouse 204, and a display 205. The computer main body 201 controls operations and the like of the apparatus main body 10. The computer main body 201 controls the operations of the apparatus main body 10 using a circuit such as a control board (hardware) and a program executed by a CPU (software). In addition, the computer main body 201 calculates information about the work piece WK based on a signal output from the apparatus main body 10, and displays the calculation result on the display 205.

A joystick 203 is used when setting the position where image capture of the work piece WK is performed. Specifically, a user operates the joystick 203 and can thereby change the relative positional relationship between the work piece WK and the image capture apparatus 15, and can adjust the position of the image capture region displayed on the display 205.

Configuration of Z-Axis Drive Mechanism

Figure 2A:
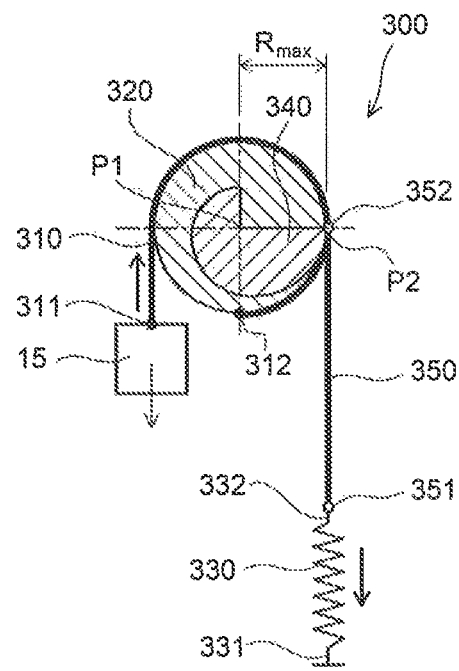
FIGS. 2A and 2B show schematic views illustrating a configuration of a counterbalance mechanism.
Figure 2B:
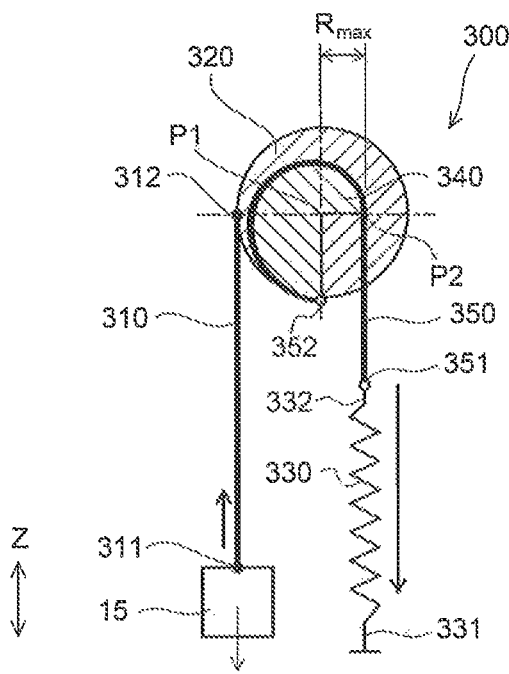

FIGS. 2A and 2B show schematic views illustrating a configuration of a counterbalance mechanism. The counterbalance mechanism is included in the Z-axis drive mechanism 300. The counterbalance mechanism includes a hanging member 310 of the image capture apparatus 15, a pulley 320, a spring 330, and a cam 340. A wire or a belt is used for the hanging member 310. The image capture apparatus 15 is connected with a first end 311 of the hanging member 310. A second end 312 of the hanging member 310 is fixated to an outer circumferential surface of the pulley 320. The hanging member 310 is wound around the outer circumferential surface of the pulley 320 and is in a state where the image capture apparatus 15 is suspended. Accordingly, winding up and withdrawal of the hanging member 310 are performed by rotation of the pulley 320. When the hanging member 310 is withdrawn through the pulley 320, the image capture apparatus 15 descends in the Z axis direction, whereas the image capture apparatus 15 lifts up in the Z axis direction when the hanging member 310 is wound up.

A first end 331 of the spring 330 is a fixed end and a second end 332 is a movable end. The second end 332 of the spring 330 is connected with a first end 351 of a coupling portion 350. A second end 352 of the coupling portion 350 is fixated to a surface (profile surface) of the cam 340. A wire or a belt is used for the coupling portion 350. Accordingly, winding up and withdrawal of the coupling portion 350 are performed by the rotation of the cam 340. When the coupling portion 350 is wound up on the cam 340, the spring 330 is stretched, whereas the spring 330 contracts when the coupling portion 350 is withdrawn.

The cam 340 rotates in conjunction with the pulley 320. For example, the cam 340 and the pulley 320 are coaxial and are coupled in a superimposed state. Therefore, the pulley 320 rotates when the image capture apparatus 15 vertically moves in the Z axis direction, and the cam 340 rotates with the rotation, and the spring 330 expands and contracts due to the rotation of the cam 340.

As shown in FIG. 2A, when the image capture apparatus 15 lifts up, the spring 330 contracts. In contrast, as shown in FIG. 2B, when the image capture apparatus 15 descends, the spring 330 stretches.

The profile of the cam 340 (shape of the cam) is in a shape inhibiting an increase of rotational torque of the pulley 320 from the increase of elastic force due to the stretch of the spring 330. A specific example includes a profile in which a distance between a center of rotation P1 of the cam 340 and a position of the cam 340 (force point P2) where the elastic force of the spring 330 is provided shortens as the stretching amount of the spring 330 increases.

In the examples illustrated in FIGS. 2A and 2B, the coupling portion 350 wound around the profile surface of the cam 340 separates from the profile surface and the position where this separation occurs becomes the force point P2 (position where the elastic force of the spring 330 is provided to the cam 340). Due to the rotation of the cam 340, the force point P2 displaces along the profile surface. Therefore, the distance along the profile surface between the force point P2 and the center of rotation P1 changes based on a rotation angle of the cam 340.

For example, the distance between the center of rotation P1 of the cam 340 and the force point P2 is defined to be R. As shown in FIG. 2A, when the image capture apparatus 15 is at the highest position, the distance between the center of rotation P1 of the cam 340 and the force point P2 is at the longest, Rmax. As shown in FIG. 2B, when the image capture apparatus 15 is at the lowest position, the distance between the center of rotation P1 of the cam 340 and the force point P2 is at the shortest, Rmin. The distance R changes gradually from Rmax to Rmin by the rotation of the cam 340.

Accordingly, as the elastic force increases by stretching the spring 330, the distance R between the center of rotation P1 of the cam 340 and the force point P2 is shortened. Therefore, though the elastic force of the spring 330 increases, the increase of rotational torque of the cam 340 and the pulley 320 is inhibited.

In other words, even though the spring 330 is stretched and the elastic force increases as the image capture apparatus 15 is displaced downward, the increase of the force lifting the image capture apparatus 15 is inhibited by this type of the cam 340 profile. Accordingly, regardless of the stretching amount of the spring 330, the position of the image capture apparatus 15 in the vertical direction can be maintained stably.

The profile of the cam 340 is preferably in a shape keeping a balance between the force of the image capture apparatus 15 attempting to descend and the force of lifting the image capture apparatus 15 obtained by the rotational torque of the pulley 320. Accordingly, even though the elastic force of the spring 330 changes based on the position of the image capture apparatus 15 in the vertical direction, the resistance force against the descent of the image capture apparatus 15 can be kept constant.

In addition, since the distance Rmax is equal to or smaller than a radius of the pulley 320, the coupling portion 350 is wound around the profile surface of the cam 340 which is equal to or smaller than the radius of the pulley 320. Accordingly, the stretching amount of the spring 330 can be reduced with respect to a stroke of the image capture apparatus 15 in the Z axis direction.

Specific Example of Z-Axis Drive Mechanism

Figure 3:
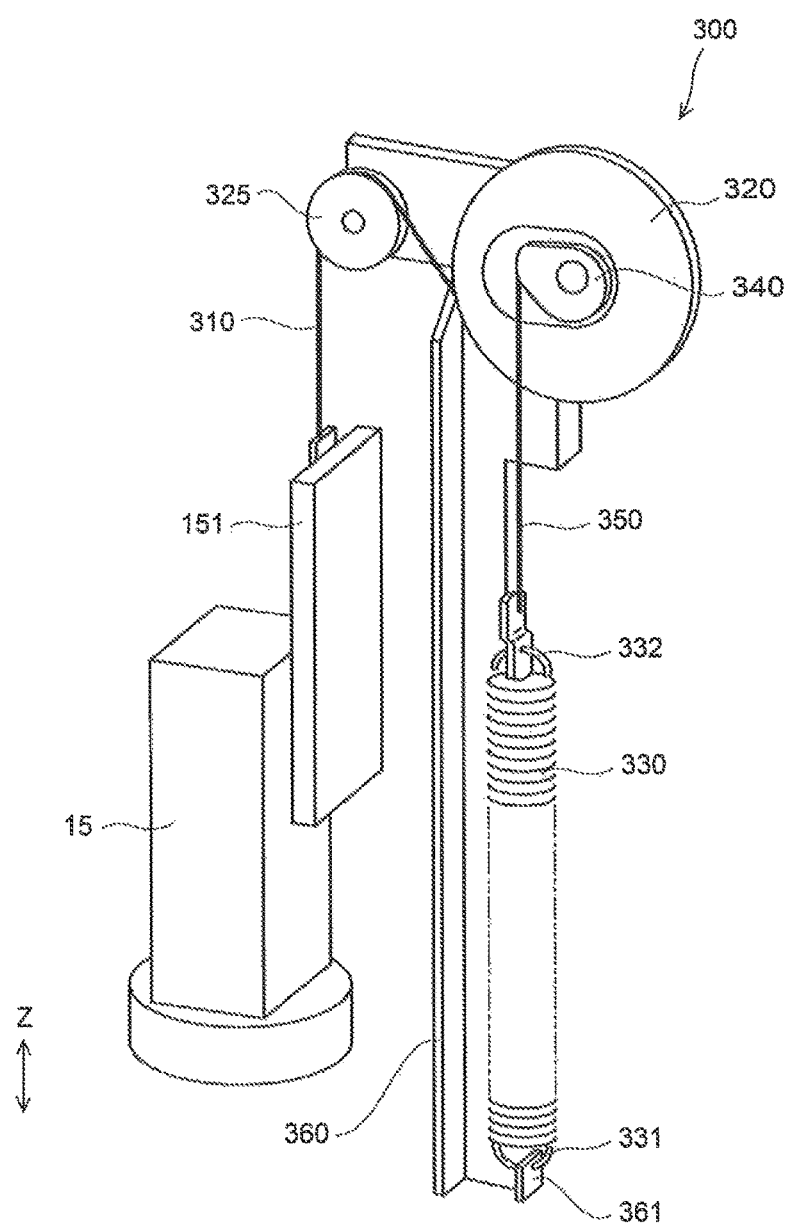
FIG. 3 is a perspective view illustrating a specific example of a Z-axis drive mechanism.

FIG. 3 is a perspective view illustrating a specific example of the Z-axis drive mechanism. The image capture apparatus 15 is fixated to a base member 151. The first end 311 of the hanging member 310 is connected with the base member 151. The base member 151 is guided in the vertical direction and displaces vertically following a guide (not shown in drawings). The base member 151 is capable of vertical movement by a driver such as a motor (not shown in drawings). The counterbalance mechanism described above is included in the Z-axis drive mechanism 300.

The hanging member 310 is wound around the pulley 320 via a sub pulley 325. The distance between the image capture apparatus 15 and the spring 330 can be increased by the sub pulley 325. The pulley 320, the sub pulley 325, the spring 330, and the cam 340 are fixated to a main body frame 360.

The first end 331 of the spring 330 is hooked on a support portion 361 attached to the main body frame 360. An adjuster may be provided to the support portion 361. When the attached position of the first end 331 of the spring 330 can be adjusted by the adjuster in expansion and contraction directions of the spring 330, the elastic force of the spring 330 can be adjusted for an individual difference.

In the Z-axis drive mechanism 300, when the base member 151 is displaced downward by the driver such as the motor, the hanging member 310 is drawn out and the pulley 320 rotates. With the rotation, the cam 340 rotates and winds up the coupling portion 350, stretching the spring 330. Meanwhile, when the base member 151 is displaced upward by the driver, the hanging member 310 is wound up and the pulley 320 rotates. With the rotation, the cam 340 rotates and coupling portion 350 is withdrawn by the elastic force of the spring 330. When the coupling portion 350 is withdrawn, the spring 330 also contracts.

Rotational Torque of Counterbalance Mechanism

Figure 4A:
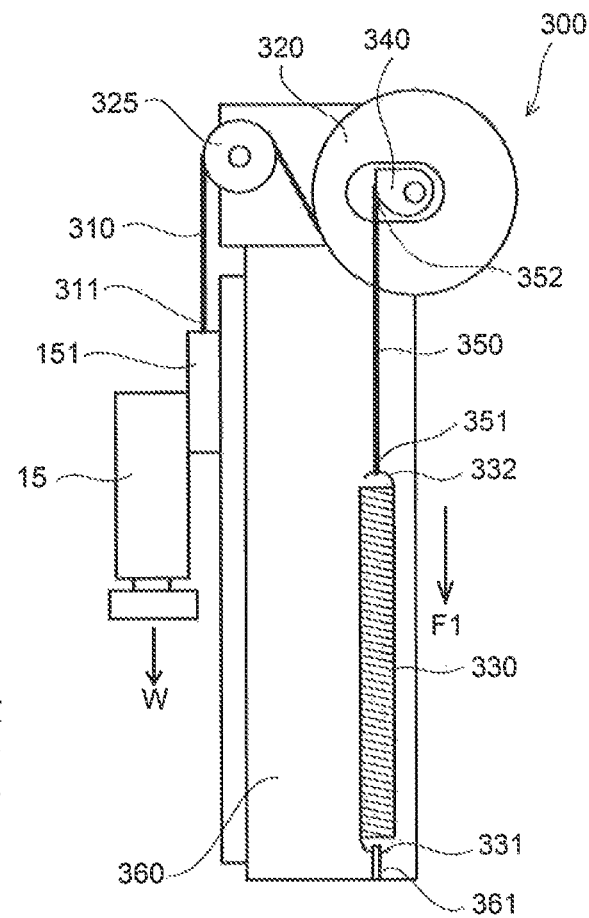
FIGS. 4A and 4B show schematic views illustrating rotational torque of the counterbalance mechanism.
Figure 4B:
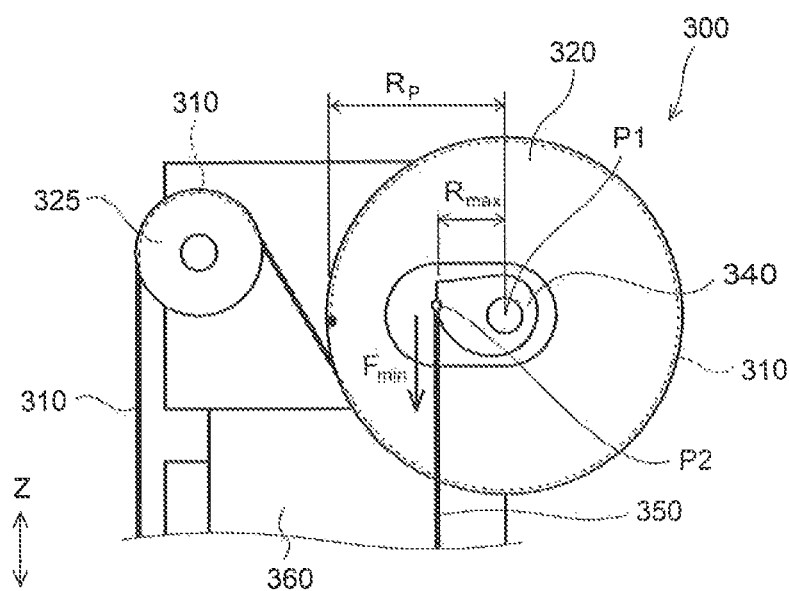
Figure 5A:
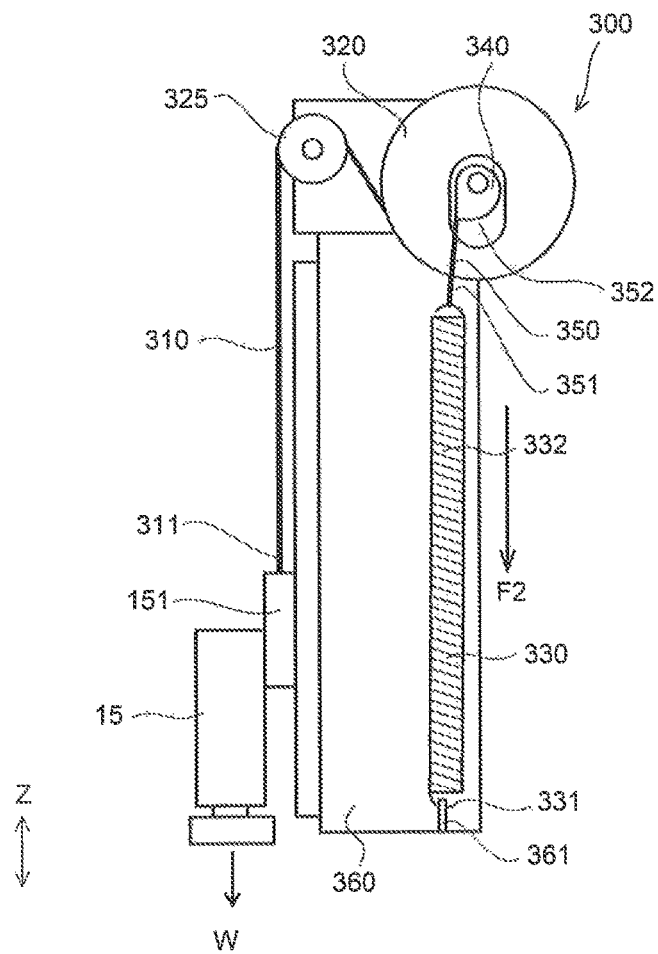
FIGS. 5A and 5B show schematic views illustrating the rotational torque of the counterbalance mechanism.
Figure 5B:
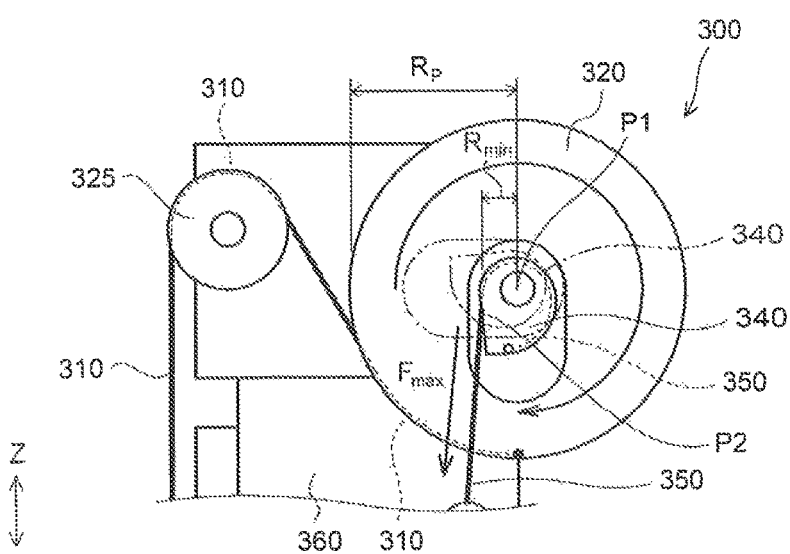

FIGS. 4A to 5B show schematic views illustrating rotational torque of the counterbalance mechanism. FIGS. 4A and 4B illustrate states where the image capture apparatus 15 is at the highest position while FIGS. 5A and 5B illustrate states where the image capture apparatus 15 is at the lowest position. FIG. 4B is a partially enlarged view of FIG. 4A and FIG. 5B is a partially enlarged view of FIG. 5A.

In this example, a weight of the image capture apparatus 15 is defined as W, and the radius of the pulley 320 as Rp. In addition, as shown in FIG. 4A, the elastic force of the spring 330 in the state where the image capture apparatus 15 is at the highest position is defined as F1. The elastic force is defined as Fmin when the stretch of the spring 330 is at the minimum, which is the elastic force F1. As shown in FIG. 5A, the elastic force of the spring 330 is defined as F2 in the state where the image capture apparatus 15 is at the lowest position. The elastic force is defined as Fmax when the stretch of the spring 330 is at the maximum, which is the elastic force F2.

As shown in FIGS. 4A and 4B, when the image capture apparatus 15 is at the highest position, the distance between the center of rotation P1 of the cam 340 and the force point P2 is Rmax and the force applied to the force point P2 is the elastic force Fmin. Therefore, the rotational torque of the cam 340 is expressed as Fmin×Rmax. The radius Rp of the pulley 320 is constant, and therefore the rotational torque provided to the pulley 320 by the weight W of the image capture apparatus 15 is expressed as W×Rp. By matching the rotational torque of the cam 340 (Fmin×Rmax) with the rotational torque provided to the pulley 320 by the weight W of the image capture apparatus 15 (W×Rp), the force of the image capture apparatus 15 attempting to descend and the force of lifting the image capture apparatus 15 are kept in balance, and the position of the image capture apparatus 15 is maintained.

Meanwhile, as shown in FIGS. 5A and 5B, when the image capture apparatus 15 is at the lowest position, the distance between the center of rotation P1 of the cam 340 and the force point P2 is Rmin and the force applied to the force point P2 is the elastic force Fmax. Therefore, the rotational torque of the cam 340 is expressed as Fmax×Rmin.

In the present embodiment, the rotational torque is defined by the profile of the cam 340 to be constant as W×Rp from Fmin×Rmax to Fmax×Rmin. Accordingly, no matter where in the vertical position the image capture apparatus 15 is positioned, the force of the image capture apparatus 15 attempting to descend and the force of lifting the image capture apparatus 15 are kept in balance, and the position of the image capture apparatus 15 is maintained.

According to the present embodiment, the position of the image capture apparatus 15 can be maintained easily without using a balance weight, and therefore weight reduction of the image measuring apparatus 1 can be achieved as compared to a case where the balance weight is used. Accordingly, a load to the driver is reduced and displacement control of the image capture apparatus 15 can be readily performed. In addition, because a space in which to position the balance weight is not necessary, the size of the image measuring apparatus 1 can be reduced. In addition, regardless of the stretching amount of the spring 330, the position of the image capture apparatus 15 can be maintained stably and the position of the image capture apparatus 15 can be controlled with high accuracy.

Particularly, in cases where the Z-axis drive mechanism 300 is displaced together with the image capture apparatus 15 in the X axis direction, or in the X and Y axis directions (displacement in the horizontal direction), the load on the displacement mechanism (also referred to as a displacer) can be reduced by the reduced-weight Z-axis drive mechanism 300 and durability, controllability, and reliability also can be improved due to the weight reduction of the Z-axis drive mechanism 300.

An embodiment of the invention is described above, however, the present invention is not limited to this example. For example, a chain may be used instead of the wire or the belt for the hanging member 310 (also referred to as a hanger) and the coupling portion 350. In addition, when using the chain, a sprocket may be used instead of the pulley 320 or the sub pulley 325. In addition, besides the image measuring apparatus 1, the present invention can be applied to a measuring apparatus measuring the work piece WK by displacing a measurement head or a stylus head in the vertical direction. With respect to the above-described embodiment, a person skilled in the art can perform addition, deletion, and design modification of configuration elements as appropriate, and can combine features of the embodiment as appropriate, and such modifications are also included in the scope of the present invention as long as they fall within the subject matter of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A measuring apparatus comprising:
   a stage on which an object to be measured is placeable;
   a measurement head having an information obtainer configured to obtain information about the object; and
   a vertical driver supporting the measurement head so as to allow movement in a vertical direction,
   wherein the vertical driver includes a counterbalancer comprising:
   a hanger for the measurement head;
   a pulley configured to wind up and withdraw the hanger by rotation about a pulley rotation axis;
   a spring configured to increase elastic force by stretching the spring when the measurement head displaces downward;
   a sub pulley configured to change the distance between the spring and the pulley rotation axis; and
   a cam configured to rotate in conjunction with the pulley and inhibiting an increase of rotational torque of the pulley due to the increase of the elastic force by stretching the spring.

2. The measuring apparatus according to claim 1, wherein the cam has a shape configured to maintain a balance between a force of the measurement head attempting to descend and a force of lifting the measurement head obtained by the rotational torque.

3. The measuring apparatus according to claim 1, wherein a distance between a center of rotation of the cam and a force point of the cam where the elastic force of the spring is applied grows shorter as the elastic force of the spring is increased.

4. The measuring apparatus according to claim 1, further comprising an adjuster configured to adjust an attachment position of a fixed end of the spring.

5. The measuring apparatus according to claim 1, further comprising a horizontal displacer configured to displace the measurement head horizontally together with the vertical driver.

6. The measuring apparatus according to claim 1, further comprising:
   a driver configured to guide a base, to which the information obtainer is fixated, in the vertical direction.

* * * * *